US009878259B2

(12) United States Patent
Brandwijk et al.

(10) Patent No.: US 9,878,259 B2
(45) Date of Patent: Jan. 30, 2018

(54) SENSING DEVICE AND CONSTRUCTION ELEMENTS COMPRISING A SENSING DEVICE

(71) Applicant: RND BY US B.V., Bilthoven (NL)

(72) Inventors: Arie Quirinus Bastiaan Brandwijk, Bilthoven (NL); Ibrahim Abdel-Aziz Mohamed Kamal, Limoges (FR)

(73) Assignee: RND BY US B.V., Bilthoven (NL)

( * ) Notice: Subject to any disclaimer, the term of this patent is extended or adjusted under 35 U.S.C. 154(b) by 0 days.

(21) Appl. No.: 15/536,604

(22) PCT Filed: Dec. 14, 2015

(86) PCT No.: PCT/NL2015/050866
§ 371 (c)(1),
(2) Date: Jun. 15, 2017

(87) PCT Pub. No.: WO2016/099260
PCT Pub. Date: Jun. 23, 2016

(65) Prior Publication Data
US 2017/0333803 A1 Nov. 23, 2017

(30) Foreign Application Priority Data

Dec. 15, 2014 (NL) ..................................... 2013986

(51) Int. Cl.
*A63H 33/08* (2006.01)
*A63H 33/04* (2006.01)
(Continued)

(52) U.S. Cl.
CPC .......... *A63H 33/042* (2013.01); *A63H 33/08* (2013.01); *A63H 33/26* (2013.01); *H04W 84/18* (2013.01)

(58) Field of Classification Search
CPC ...... A63H 33/04; A63H 33/042; A63H 33/08; A63H 33/26; H04W 84/18
See application file for complete search history.

(56) References Cited

U.S. PATENT DOCUMENTS 5,853,327 A * 12/1998 Gilboa ................ A63F 3/00643
273/237
6,443,796 B1 * 9/2002 Shackelford ......... A63H 33/042
273/237
(Continued)

FOREIGN PATENT DOCUMENTS

WO 2010150232 A1 12/2010
WO 2014167565 A1 10/2014

*Primary Examiner* — Michael Dennis
(74) *Attorney, Agent, or Firm* — Aeon Law PLLC; Adam L. K. Philipp; Manasi Vakil

(57) ABSTRACT

The invention provides a sensing device that can be incorporated in a construction element for a toy construction set to allow new use of construction elements, for instance tracking the construction process. Sensing device comprises a carrier comprising a top surface provided with a series of top coils, a bottom surface with a series of bottom coils at a distance from said top coils, the sensing device further comprising a data processor functionally coupled with a memory for storing a status, said data processor comprises a computer program which controls and reads currents through each of said top and bottom coils and storing them in memory, thereby tracking status for each of said top and bottom coils.

26 Claims, 5 Drawing Sheets

(51) Int. Cl.
*A63H 33/26* (2006.01)
*H04W 84/18* (2009.01)

(56) References Cited

U.S. PATENT DOCUMENTS

| | | | | |
|---|---|---|---|---|
| 6,690,156 B1* | 2/2004 | Weiner | ............... | G01S 5/02 |
| | | | | 273/237 |
| 2010/0311300 A1* | 12/2010 | Hansen | ............... | A63H 33/042 |
| | | | | 446/91 |
| 2011/0021107 A1* | 1/2011 | Nag | ............... | A63H 33/042 |
| | | | | 446/91 |
| 2011/0143629 A1* | 6/2011 | Seymour | ............... | A63H 33/04 |
| | | | | 446/91 |
| 2013/0217295 A1* | 8/2013 | Karunaratne | ............... | A63H 33/086 |
| | | | | 446/124 |

* cited by examiner

SENSING DEVICE AND CONSTRUCTION ELEMENTS COMPRISING A SENSING DEVICE

FIELD OF THE INVENTION

The invention relates to a sensing device, construction element comprising a sensing device, and a system comprising a playboard and construction elements.

BACKGROUND OF THE INVENTION

Well known construction elements are for instance Lego building elements. These well known building elements allow building by snap-fitting the building elements together. Lego is always looking for new elements and new use. For instance, WO2010/009731 according to its abstract discloses a building element for a toy building set, comprising a body part with coupling studs on the top face and complementarily configured coupling means on the bottom face, and wherein one or more electrical conductors is/are provided that connect one or more coupling studs with one or more complementarily configured coupling means; and wherein the conductors comprise an electrically insulating and curable material into which a plurality of electrically conductive elements are admixed and distributed, such as fibres or particles, in such a way that the conductor is able to convey the current through the conductor from the coupling stud to an electrical contact face on the complementarily configured coupling means.

US2014302740 discloses according to its abstract a toy building block of a type which may be interconnected with similarly configured blocks has a hollow box-shaped structure having a top with cylindrical stud coupling members, and sides which together with the top define a downwardly opening cavity into which the cylindrical studs of a like configured block may be inserted for frictional interconnection. One or more integrated circuit chips are embedded within the molding material of the block, and leads incorporated within the block studs and sides provide electrical interconnection between blocks when like configured blocks are brought into frictional interengagement. In a described embodiment, components of a digital video recording system are apportioned to different blocks which when interconnected provide the complete system functionality.

WO2010/150232 according to its abstract discloses a game-system which comprises a number of building elements arranged for being assembled into at least one pre-defined three-dimensional structure, wherein said game system comprises position means for determining and/or detecting the position and/or the three-dimensional orientation of at least one of the building elements in the three-dimensional structure, and verification means for establishing if said position and/or three-dimensional orientation is correct in relation to said pre-defined three-dimensional structure. The game system according to the present invention has the advantage that the player can hold the building elements in the hands, and physically build the structure; thereby ensure that the game system according to the invention involves a level of interaction, which is not present in a conventional virtual game.

WO2014/167565 according to its abstract discloses a system for detecting proximity of two or more interlocking pieces of an interactive toy, the system comprising: a sensor configured to sense proximity between two or more interlocking pieces, and an electronic circuit configured to detect an interlocking status of said pieces according to the proximity sensed by said sensor, wherein said electronic circuit is further configured to transmit an acoustic communication signal from an acoustic transmitter upon detection of a change in the interlocking status of said pieces, said acoustic communication signal being indicative of the pieces interlocking status; and a receiving device configured to receive said acoustic communication signal and issue an alert indicative of the pieces interlocking status.

SUMMARY OF THE INVENTION

The invention provides a sensing device that can be incorporated into construction elements to allow new use of construction elements, for instance tracking the construction process and progress.

The invention provides a sensing device for in a construction element for a toy construction set, said sensing device comprising a carrier comprising a top surface provided with a series of top coils with their axes functionally parallel, a bottom surface with a series of bottom coils at a distance from said top coils and with their axes functionally aligned with said top coils, the sensing device further comprising a data processor functionally coupled with a memory for storing a status of each of said top and bottom coils, said data processor functionally coupled with said top and bottom coils for controlling an electrical current through each of said top and bottom coils and for recording changes of current in each of said top and bottom coils, allowing detection of alignment of at least one coil of another, similar sensing device with a coil of said sensing device, wherein said data processor comprises a computer program which, when running on said data processor, controls a current through each of said top and bottom coils, reads a current through each of said top and bottom coils, and from a change of said current and a level of said current calculates a status for each of said top and bottom coils, and stores said status for each coil in said memory.

The invention furthermore provides a construction element comprising a body part with a top face and a bottom face seen relative to the normal use situation of the construction element, wherein the top face comprises first coupling parts, wherein the bottom face comprises complementarily second coupling parts that are configured for removably interconnecting with corresponding first coupling parts of another construction element, and wherein said body part comprises a sensing device of the invention, with said top coils aligned with a number of first coupling parts and with said bottom coils aligned with a number of said second coupling parts.

The invention furthermore provides a construction element for a toy construction set, comprising a body part with a top face and a bottom face seen relative to the normal use situation of the construction element, wherein the top face comprises first coupling parts, wherein the bottom face comprises complementarily coupling parts that are configured for removably interconnecting with corresponding first coupling parts of another construction element, and a sensing device positioned in said body part and comprising a carrier comprising a top surface directed to said top face of said body part and provided with a series of top coils functionally aligned with at least a number of said first coupling parts and a bottom surface directed towards said bottom face of said body part and provided with a series of bottom coils functionally aligned with said top coils, the sensing device further comprising a data processor, functionally coupled with said top and bottom coils for recording changes of current in each of said coils, allowing detection of presence of another construction element coupled to one or more of the number of first coupling parts, and detecting which of the number of first coupling parts are coupled.

The invention furthermore provides a system comprising a series of construction elements of the invention and a computer system comprising a display device for providing a visual representation, and a data processor and a data receiver, wherein said data processor is provided with software which, when running on said data processor, allows receiving of data from said construction elements, and provides a representation on said display device indicating a number of the construction elements in their coupled state.

In particular, the system provides a representation on said display device during construction using said construction elements.

The invention further provides a system comprising a series of construction elements according to the invention and a playfield having a top surface comprising a series of first coupling parts and a series of coils functionally aligned with said series of first coupling parts.

The sensing device allows flexible use in elements, in particular construction elements. It allows determination of a status of associated coupling parts of an element, in particular it allows determination of associated coupling parts that are coupled to complementary coupling parts of other elements.

Intermediate feedback from the sensing device may eliminate construction errors at an early stage or may provide assistance during the construction process. In turn this may speed up the construction process or give an early insight to the builder. In that sense the sensing device may be a learning tool to the builder/user. The invention may be incorporated into a simulation or in a game wherein a representation of the construction is given to a user. The representation may amongst others be one selected of visual data and digital data. The sensing device may provide information or assistance of where to place another construction element or to remove a construction element to a user using a signal device for providing a signal which is perceptible by the senses of a user, for example visually using activating LED's, or audible, in or on a construction element or a playboard or playfield. A signal device may for instance be placed within the construction studs and may for instance be capable of presenting different colours or even LED-signals in code.

In an embodiment, said top surface and bottom surface are functionally parallel. Thus, calculation algorithms are easier as signals do not require calibration for each coil separately.

In an embodiment, said top surface and bottom surface are functionally planar. This allows easy alignment with coupling parts in an element.

In an embodiment, said data processor comprises a data transmission program for controlling a current through at least one of said coils from providing an electromagnetic field that is representative of a data stream. In particular, said data transmission program is provided for converting said statuses or statuses of other sensing devices into a data stream representative of said statuses.

This allows the use of the coils for data transmission.

In an embodiment, said data transmission program splits said data stream into a series of data stream parts and controls a series of coils in a layer to functionally simultaneously each transmit at least one of said data stream parts for providing a substantially parallel transmission of said data stream.

In an embodiment, said data processor comprises a data receiving program for converting a current through at least one of said coils into a data stream, in particular a data stream representative of said statuses, and for converting said data stream into said statuses.

In an embodiment, said data receiving program functionally simultaneously converts currents through a series of said coils into a series of data stream parts, and in particular converts said data stream parts into said statuses for providing a substantially parallel receiving of said statuses.

In an embodiment, said carrier comprises two printed circuit boards, an upper printed circuit board providing the upper surface and a bottom printed circuit board providing the bottom surface.

In an embodiment, when a coil is aligned with a first, similar sensing device and an other coil is aligned with a second, similar sensing device, the sensing device selectively transmits data, in particular status information, to the first, the second or both other, similar sensing devices.

In an embodiment, said data processor comprises a data storage comprising a data structure comprising a sensing device ID, information indicative of a relative coil position of each coil of said sensing device, and per coil a data position information indicative of alignment with a coil of another, similar sensing device.

In an embodiment, in said data structure said information indicative of alignment with a coil of another, similar sensing device comprises a sensing ID of said other, similar sensing device, and information indicative of a relative coil position of said aligned coil of said other, similar sensing device.

In an embodiment of the construction element said bottom coils are functionally aligned with at least a number of said complementary coupling parts, allowing detection of presence of another construction element coupled to one or more of said number of complementary coupling parts, and detecting which of the number of complementary coupling parts are coupled.

In an embodiment of the construction element said data processor is functionally coupled with said top and bottom coils for controlling an electromagnetic field from each of said top and bottom coils. Controlling the electromagnetic field of the coils allows more accurate sensing. It may allow sensing of a distance of one or more other, similar sensing devices.

In an embodiment of the construction element, said series of top and bottom coils are separated from one another at a distance that is larger than a distance of the top coils from the top face and larger than a distance of the bottom coils from the bottom face, in particular a distance that is larger than the sum of a distance of the top coils from the top face plus a distance of the bottom coils from the bottom face.

In an embodiment of the construction element, said data processor comprises a data structure comprising a construction element ID, and per functionally aligned first and/or complementary coupling part further construction element ID's of coupled construction elements.

In an embodiment of the construction element said sensing device further comprises a data transmitter.

In an embodiment of the construction element said data transmitter is adapted for routing or passing on data, in particular to an other construction element.

In an embodiment of the construction element, said data transmitter uses at least one of said coils for wireless data transmission, in particular to another construction element.

In an embodiment of the construction element said sensing device further comprises a power storage for electrical power.

In an embodiment of the construction element, said data processor is provided with software which, when running on said data processor, derives a status of a coupling part from a current or change of current in a coil.

In an embodiment of the construction element, said sensing device comprises multiple carriers, each carrier providing faces that are orthogonal with respect to faces of the other carriers.

In an embodiment of the construction element, said body part is block-shaped providing three sets of opposite top and bottom faces, and said sensing device providing three carriers providing three sets of opposing faces, each face functionally parallel to body part faces and each face comprising coils, each coil functionally aligned with one selected from a first coupling part and a complementary coupling part.

In an embodiment of the system comprising a series of construction elements according to the invention and a separate computer device comprising a display device, a data processor and a data receiver. Said data processor is provided with software which, when running on said data processor, allows receiving of data from at least one of said construction elements, and provides a representation via said display device indicating the construction elements in their coupled state. In particular, said display device provides a representation via said display device during construction using said construction elements.

The display device can present a visual representation to a user. The display device may for instance be a display like a LCD or OLED screen or the like, but also an augmented or virtual reality device like an Oculus Rift, or a holographic projector.

In an embodiment of the system, said separate computer device provides user feedback in relation to at least one selected from a construction of said construction elements, and during a construction using said construction elements.

The invention further relates to a system comprising a series of construction elements according to the invention and a playfield having a top surface comprising a series of first coupling parts and a series of coils functionally aligned with said series of first coupling parts.

The invention further pertains to a sensing device comprising at least two spaced-apart arrays of sensing elements, wherein said sensing elements are proximity sensing elements providing a signal corresponding to a distance between corresponding sensing elements of another sensing device, and with the sensing elements of one array of sensing elements mutually functionally aligned with the sensing elements of another of said arrays of sensing elements.

The sensing elements may said sensing element comprises a magnetic field generating part, and a magnetic field measuring sensor. Alternatively, the sensing elements may comprise an antenna, a phased array antenna, or a Near-Field antenna. These alternatives are further discussed in the description of preferred embodiments. Other embodiments described in this description may also apply to this aspect of the invention. The coils are thus replaced with sensing elements.

The elements can be used for manually building a construction. Making such a construction consistent and coherent can be easy. As will become clear below, the elements may comprise further features that may allow elements to displace under control, or even autonomously.

It was found that such a system with the elements, and/or the elements, allow flexible construction of an object. It may even be possible to design the elements within the current definition to group the elements into an object.

Here, the words "construction element", "building element" and "element" are used for any parts that can be used to construct objects. In earlier applications of the applicant, for instance US2014273730, US2014274417, US2014274416, elements are most general 3 dimensional and can be assembled (or assemble themselves) into objects. Construction elements refer to elements that comprise coupling parts that engage when construction elements are placed together. Engaging in this sense may refer to fixing, actively by one or both coupling parts, or passively by pressing one coupling part into another by pressing construction together.

Building elements refers to construction elements that have a first coupling part on one face and a second, complementary coupling part on another face. The coupling parts can engage, for instance snap-fit together. An example of such coupling parts are the studs and snap-fit walls and ribs of Lego building elements. These are in most Lego building elements positioned on opposite faces of a building element.

Elements may be passive. This means that those passive elements may for instance comprising first parts that can receive second parts, for instance for holding, for moving or for coupling. The first parts then are engaged, or forces are exerted onto these first parts, by the second parts of other, similar construction elements. In Lego Building elements, the building elements are passive. A user presses building elements together to snap-fit these building elements together. The sensing device may be functionally coupled to parts, like motion modules, or to coupling parts. Thus, when a sensing device senses alignment of parts, like alignment of one or more coupling parts, engagement may take place.

The sensing elements of the sensing device, like the coils, are functionally aligned with coupling parts of the element, in particular the construction element. This in its broadest sense means that the sensing elements of a sensing device are positioned in such a way with respect to the coupling parts of the element that when using a sensing element it can be established if a coupling part of another, similar construction element also comprising a sensing device is aligned with a coupling part that is functionally aligned with the coupling part of the element. The sensing device may be provided with one or more data processors or with signal processing electronics that allow calculation of the position of the other, similar element with respect to the element associated with the sensing device. It can allow, for instance, the sensing device to determine the distance of the other element, but also which coupling part or parts of the other element are aligned with which coupling part or parts of the element. In particular, this can be done using data transmission between sensing devices. Alternatively, when adding an identification to the electromagnetic field of each sensing element may allow a sensing device to determine which coupling part is coupled to which coupling part of another element. It can also allow the sensing device to determine which of the coupling parts of the element are in fact coupled to which coupling parts of the other element (or elements).

The upper and lower surfaces can be defined as a two-dimensional face. Thus, the positions of the sensing elements on these surfaces can be defined for instance in two dimensional coordinates, using for instance Cartesian X and Y axes. Functional alignment can thus relate to X and Y positioning of the sensing elements, like the axis of the coils, on the upper and lower surfaces of the sensing device. Providing the sensing device in an element locates its upper and lower surfaces inside the element and thus its elements with respect to coupling parts. The X and Y positions of the sensing elements can be such that a sensing element relates to a coupling part. The sensing element can for instance be provided right below a coupling part.

Functional alignment of sensing elements also relate to a distance of sensing elements to the coupling parts in a direction perpendicular to the upper and lower surfaces of the sensing device. Thus, in fact, to how far below a coupling part sensing elements are provided. In order to provide optimal sensitivity, the distance between sensing elements and functionally aligned coupling parts is as small as possible.

In the sensing device, the top surface of the carrier is provided with a series of top coils and the bottom surface is provided with a series of bottom coils. This includes in general that the coils can be positioned on top of the surface. In also includes that the coils are provided on top of a surface, like for instance a printed circuit board (PCB), and that the coils and the further surface of the PCB is covered with a protective coating layer. It also includes that the coils are provided below a surface of the carrier, relatively closed to the surface. Thus, the coils are functionally positioned in such a way that the surface is provided with the coils. In an embodiment, a coil may comprise in fact several sub-coils provided one on top of the other. If needed, an insulating layer may be provided between the various sub-coils. An advantage of using the non-contact elements like the coils is that the surface of elements does not need to be modified. This allows adding the sensing device to existing elements. The incorporation of the sensing device does not need a change of one or more exterior element (sur)faces. Furthermore, the condition of the surface of the element is not critical. Furthermore, it allows the sensing device to be sealed off. When using the sensing device in toys, for instance, children can even take them into they mouth without detrimental effects. Moisture does not need to influence the working when proper sealing is used.

In the sensing device, the top surface of the carrier is provided with a series of top coils and a bottom surface with a series of bottom coils at a distance from said top coils. Thus, at least two layers of coils are provided. The distance between these layers of coils is in fact an electromagnetic separation that in case a layer of air is provided between the layers of coils can be expressed as $D \times \in$, with $\in = \in_o \times \in_r$, the dielectric permittivity of the material between the layers of coils. When the separation is mainly air, $\in_r$ is almost equal to $\in_o$, the vacuum permittivity which is about $8.8541878176 \times 10^{-12}$ F/m. For accurate detection, usually it is desired that the detection distance between sensing devices is smaller than the separation $D \times \in$ between layers of coils of a detection device. Alternatively, distance and alignment of each of the coils of a sensing device with respect to one another may prove less critical when for instance the properties of each of the coils are known and used in calculations, or when for instance signal processing of the signals resulting from each of the coils is applied. For instance, the properties of each coil may differ in a known, calibrated manner. Alternatively or in combination, using signal processing the sensing device may allow determination of the status of the coupling parts even without critical positioning of coils. For instance using timing of signals, time sequences of signals, and other signal processing, known to a skilled person, it may be possible to derive the status of coupling parts. Each coil of a sensing device may for instance have its own modulation in intensity, timing, or the like, of its generated electromagnetic field. Polarization may also be manipulated. Thus, the coils in fact operate as antennas. When distances between sensing elements become small, the coils may operate in so called "Near Field" operation conditions.

More correctly when using magnetic fields is referring to the physical constant $\mu_0$, commonly called the vacuum permeability, permeability of free space, or magnetic constant is an ideal, (baseline) physical constant, which is the value of magnetic permeability in a classical vacuum. Vacuum permeability is derived from production of a magnetic field by an electric current or by a moving electric charge and in all other formulas for magnetic-field production in a vacuum. In the reference medium of classical vacuum, $\mu_0$ has an exact defined value $\mu_0 = 4\pi \times 10-7$ V·s/(A·m)≈1.2566370614 . . . ×10−6 H·m−1 or N·A−2 or T·m/A or Wb/(A·m) in the SI system of units. In SI units, the speed of light in vacuum, $c_0$ (299 792 458 ms$^{-1}$) is related to the magnetic constant and the electric constant (vacuum permittivity), $\in_0$, by the definition:

$$c_0 = \frac{1}{\sqrt{\mu_0 \varepsilon_0}}.$$

In this description, a configuration is used for an assembly of elements that are grouped together in a substantially consistent orientation with respect to one another. The elements in such a configuration may form an object. For such an object to change its shape, one or more elements move or displace with respect to other elements. This statement, however, does not work the other way around: Elements may have displaced, but that does not always mean that the shape of the object changed. If at least some of the elements of an object displace in a predefined manner, it is possible to in fact have displaced the entire object.

The various modules and parts are 'coupled'. In particular, this relates to functionally coupled. In particular embodiments, this relates to parts or modules that are physically coupled. More in particular, in an embodiment it is used to cover connected. Specifically, in an embodiment parts, faces, modules and the like that are fixed or mounted. In this respect, fixed refers to for instance welding, gluing, and the like. Fixed may even be a generic, covering both permanently fixed and non-permanently fixed. In this sense, welding may be seen as permanently fixed. In order to remove permanently fixed parts from one another, if already possible, the parts will be damaged. Some types of gluing are examples of non-permanently fixing. For instance, using hot-melt glue, when heating the glued parts, the glue may melt and parts can be detached. Mounted may refer to the use of attachment provisions, like bolts and nuts.

'Interacting' relates to modules and/or elements that exert force to one another, but also to exchanging data, exchanging instruction program parts, and exchanging feedback. In an embodiment, interacting relates to modules and/or elements that are in contact. In an embodiment, interacting relates to modules and/or elements that are engaging.

An element may comprise parts defining an outer contour of an element. For instance, an element may comprise ribs. An element comprises a face. A face at least has supports allowing one element to rest on another element. Ribs for instance define such a face. The space between ribs may be open. Alternatively, support may be provided by exerting a force, for instance aerodynamic or electromagnetic forces. In an embodiment, each element further comprising a face provided with a surface at a surface-distance from said centre point. Such a surface provides a solid, physical support. A surface may be completely closed. Alternatively, a face may comprise a surface that has openings. For instance, the surface may be meshed. Often, such a face is planar, defining a bounded plane.

In an embodiment, said element comprises a series of faces each having a surface, in particular said faces defining said element.

In an embodiment, said element comprises a series of at least two of said faces, in particular said element comprises a series of coupled faces forming faces of said element.

In an embodiment, said element comprises at least 4 faces, in particular at least 6 faces, more in particular opposite and having a normal direction orthogonal normal.

In an embodiment, said element is a regular body.

In an embodiment, said element is substantially a block, more in particular a cube. An advantage of cubes is that they allow easy stacking.

An element can be characterised by its position and orientation. Both position and orientation may be absolute and relative. The relative position can be defined as a position of an element with respect to one or more other elements. Relative position may also be defined as the position of an element in an object it forms together with other elements, or the position in a group of elements. In an embodiment, elements may be provided with a position sensing part functionally coupled to said data processing module. The sensing part may be part of the sensing device discussed earlier.

In an embodiment said element comprises walls defining the outer boundaries of an element. In an embodiment, at least one wall comprising a planar surface part.

In an embodiment, an element comprises at least one functional surface, for instance comprising a photovoltaic element. Alternatively or in combination, a functional surface is provided with one or more display elements. A display element may comprise one or more pixels that may form a display. In an embodiment, the neighbouring surfaces of several elements may form a display. Thus, the elements allow presentation of visual information. Furthermore or alternatively, the functional surface may comprise touch-functionality and/or proximity-sensing, allowing formation of for instance a touch panel. In an embodiment, elements can be combined to form a display for playing movies, television, or games. In case of elements which have sides smaller than 1 cm, the elements will in many instances combine the functional surfaces into one display of combined element-functional surfaces.

The element may comprise a data processor.

In an embodiment, the size of the elements is 10 cm down to 0.1 micron, in particular 1 cm down to 0.5 micron, more in particular 1 mm down to 0.5 micron, specifically 100 micron down to 0.1 micron. In particular, the sensing device can be built into a Lego building element. These Lego Building elements come into the "regular" Lego building elements, and the larger "Duplo" Building elements.

In an embodiment, an element is at least partly produced using for instance 3D printing. In an embodiment, plant cells may be used for producing a "wood" surface. Such plant cells may be attached to a carrier substrate.

A sensing device can be produced separate from an element and be placed into the element in a separate step. For instance, a sensing device may be pressed into a Lego Building element. Alternatively, a sensing device may be produced and in a separate production step an element is shaped or produced around the sensing device. For instance, an element can be injection moulded around a sensing device. In another embodiment, the sensing device can be produced together with an element. For instance, using 3D printing a sensing device and building element, like a Lego building element, can be produced in one production process.

In an embodiment, elements in an assembly of elements work together, as is discussed in US2014273730, US2014274417, US2014274416. For instance the communication between elements as described may be used.

The invention further pertains to a game assembly, comprising a system described above, and a computing device in communication with at least one of said elements, said computing device running a computer program which, when operating on said computing device, performs the steps of:

receive data from said assembly relating to a configuration of the assembly;

indicate on a display device a representation of said configuration to a user.

With the sensing device, it is possible to visualise for instance a construction process using said elements. The display device may comprise a display, a touch screen, a virtual reality device, a holographic projector, and the like. These devices provide a visual indication of the construction to a user. The construction process relates to coupling of additional elements, but also to the removal or decoupling of elements.

In an embodiment placing or removing construction elements with a sensing device may be functioning akin to a game controller for a game or simulation.

In an embodiment placing or removing construction elements with a sensing device may unlock certain abilities within a game or simulation.

In an embodiment placing or removing construction elements with a sensing device in a first system may be having an effect upon another system remotely connected to the first system, for instance akin to a multiplayer network game or simulation.

In an embodiment, some or all of the sensing devices can communicate with one another. As explained, communication may be done via a communication device in the sensing device. In particular, the communication device uses one or more of the sensing elements, for instance the coils, for transmitting and receiving data. In an embodiment, the elements can set up a peer-to-peer network, or provide communication via a peer-to-peer setup.

In an embodiment, the sensing device of the elements operate individually. In another embodiment, the sensing devices of an assembly operate in a master-slave setting. This may be a traditional master-slave setting, as such known to a skilled person. This may also be a master-slave setting in which functions are distributed but a sensing device operates as a master, managing the other sensing devices. Different management models known to a skilled person may be used. In such a master-slave setting, the status of master may be dynamic, going from one sensing device to a next sensing device, depending on circumstances, like availability of power, location of a sensing device with respect to a remote device requesting data, and the like. As explained, a sensing device may have a standardised number of sensing elements. This may require that more than one sensing device is used in an element. Usually, together the sensing elements of these sensing devices are associated with all the coupling parts. In such settings, in an embodiment the sensing devices in an element communicate with one another. These sensing devices may comprise a physical coupling, allowing them to communicate with one another. In such a situation, a master-slave setting may streamline communication between sensing elements in an element. Again, such a master-slave setting may be dynamic, i.e., the master setting may shift between sensing elements depending on circumstances.

As mentioned, an element may comprise more than one sensing element. Alternatively, a sensing device may be build up modularly. Thus, a sensing module may comprise sensing elements and a data processor, while other sensing modules only hold sensing elements. Thus, the functionality of the sensing device may be distributed over various sensing modules that together form a sensing device. These sensing device modules may be coupled physically, but even wireless coupling between sensing modules may be considered. This allows sensing modules to communication with one another. Thus, an element may comprise a sensing device that is build up from sensing modules. The functionality of the sensing device can be distributed over the different sensing modules. Alternatively, an element may hold more than one sensing device. Combination thereof may also be possible. In an embodiment, each of the surfaces provided with coils, or, more general, each of the arrays provided with sensing elements, may be a separate sensing modules. Each sensing module can be provided with a data processor. Alternatively or in combination, some of the functionalities of the sensing device may be distributed over the sensing modules forming a sensing device. Alternatively, some of the functionalities or functional parts may be provided to some sensing modules, and other functional parts to other sensing modules. For instance, only one of the sensing modules of a sensing device may have a data processor. Thus, using sensing modules, mass production of the sensing device can be simplified.

A sensing device may comprise a motion sensor for selectively activating a sensing device, or changing a reduced power mode of the sensing device. This can reduce the power need. Thus, when motion takes place, for instance the data processor can be activated to read the current through of the coils, or set a current for generating an electromagnetic field.

The documents US2014273730, US2014274417, US2014274416, where relevant, are incorporated by reference as if fully set forth in this document.

In the current document, reference is made to three dimensional objects or 3D objects. The elements are three dimensional. Thus, simply placing elements together on a plane surface already makes an object three dimensional. A three dimensional object according to the current description, however, refers to an object that is composed of coupled elements and extending at least two elements in each dimensional direction. Such a three dimensional object or 3D object would have at least 4 elements. In fact, three elements might already form a 3D object when one or more elements are out-of-plane with respect to the other elements.

In general, elements may comprise one or more faces that may be defined as being "polar". An example of this are the Lego Building elements. More in general, suppose that one type of face may be defined as having the property "plus" and another type of face may have the property "minus" with respect to at least one of the motion module, motion restriction module, motion guiding module. Now suppose that a plus face can only couple to and displace over a minus face. When using elements like that, in general ordering of elements with respect to one another becomes important when composing or building an object out of elements. In general formulation, an element comprises at least one face that comprises at least one mirror symmetry with respect to at least one face of another element in view of at least one selected from the motion module, motion guiding module and motion restriction module when facing that other face. These symmetries may be referred to as inter-face symmetry. In an embodiment, the at least one face comprises at least one mirror symmetry with respect to the at least one other face with respect to its shape. Thus, two elements have at least one orientation with respect to one another in which they have a respective face and in which these faces fit on one another, can attach to one another, and move or displace over each others surface.

In an embodiment, the elements have a shape to allow tessellation in at least two dimensions. More formally, a tessellation or tiling is a partition of the Euclidean plane into a countable number of closed sets called tiles, such that the tiles intersect only on their boundaries. These tiles may be polygons or any other shapes. Many tessellations are formed from a finite number of prototiles; all tiles in the tessellation are congruent to one of the given prototiles. If a geometric shape can be used as a prototile to create a tessellation, the shape is said to tessellate or to tile the plane, or, using elements, a space. Certain polyhedra can be stacked in a regular crystal pattern to fill (or tile) three dimensional space, including the cube (the only regular polyhedron to do so); the rhombic dodecahedron; and the truncated octahedron. Lego, on the other hand knows different shapes of building elements that can be fitted together to form all sorts of objects. The sensing device can have a shape that can fit into various building elements.

Construction elements may be combined into an object by placing construction elements on top of one another. Construction elements may also or additionally be held together by allowing at least some of the construction elements in an object to exert an attracting onto other construction elements in the object. When combining construction elements into an object, the construction elements may be placed substantially on top of one another. Thus, construction elements may align in three dimensions. In particular, the sensing device allows detection of the alignment of coupling parts of construction elements.

The person skilled in the art will understand the term "substantially" in this application, such as in "substantially encloses" or in "substantially extends up to". The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like if used in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The construction elements herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

Additional features described may allow increasing complexity of the system, or may allow elements to function more or less autonomous. Elements may group together to perform tasks, possible by features that all the elements have, or using one or more features that only one or part of the elements have.

The invention further applies to construction element or parts thereof comprising one or more of the characterising features described in the description and/or shown in the attached drawings. The invention further pertains to a method or process comprising one or more of the characterising features described in the description and/or shown in the attached drawings.

The various aspects discussed in this Patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, showing an embodiment of a construction element, and showing in:

FIG. 6 an alternative embodiment of a sensing device, with

The drawings are not necessarily on scale.

DESCRIPTION OF PREFERRED EMBODIMENTS

Figure 5:
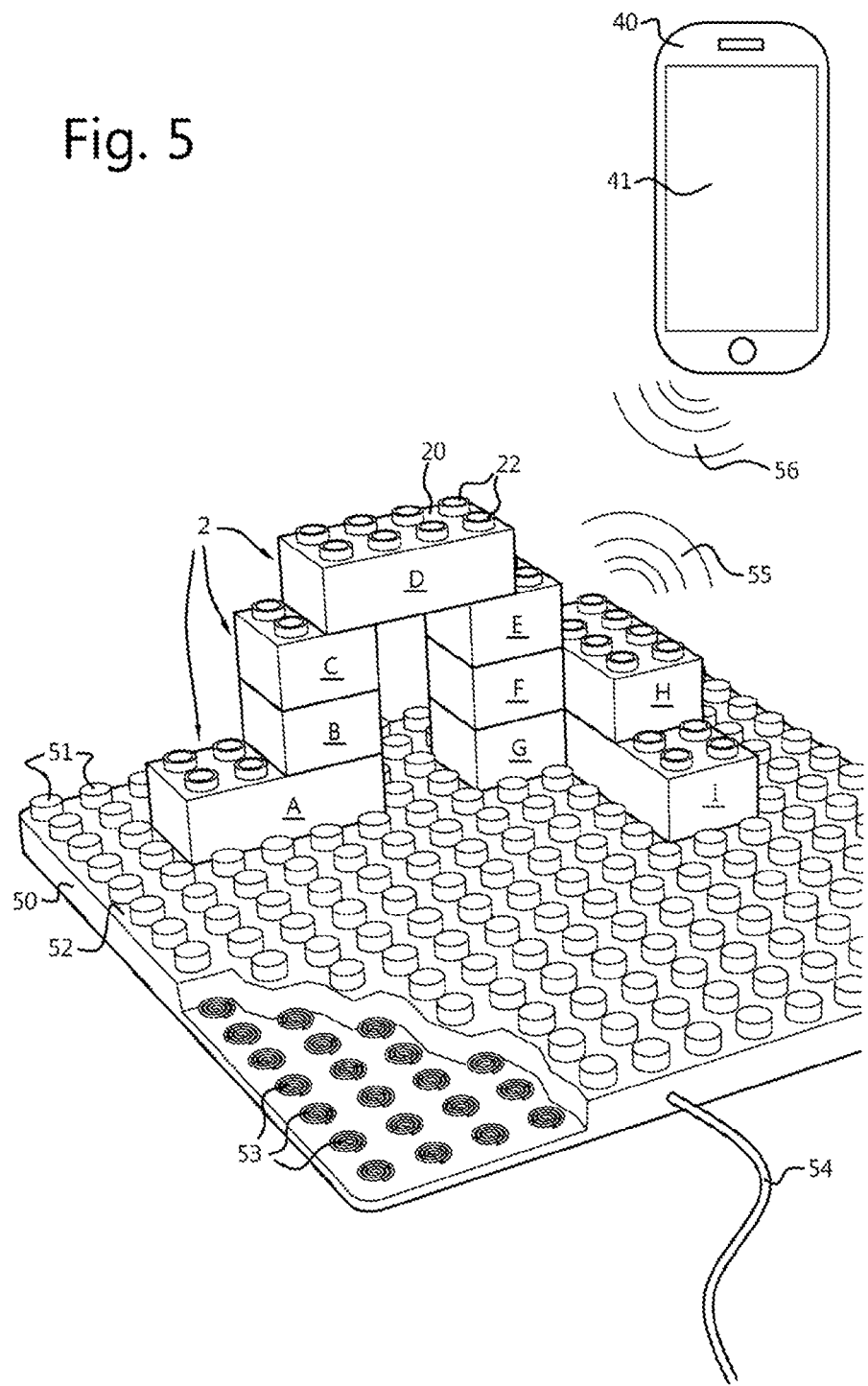
FIG. 5 a play situation showing a set of differently shaped building elements each fitted with sending devices, fitted onto a building plate, and a remote device with a display.

The current invention relates to a sensing device and construction elements, in particular building elements, comprising the sensing device. This can be implemented in various ways that will be discussed below in various illustrative embodiments. In a first embodiment, shown in FIGS. 1-3, the sensing device can be a separate unit that can be placed into a building element. This can for instance be done after the building elements are produced. Thus, the sensing device may be provided as an add-on or a snap-in. Alternatively, the sensing device may be incorporated into building elements during production of the building elements. In FIG. 5, the use of various building elements each provided with a sensing device together with a playboard is demonstrated. Also, an alternative implementation of the sensing device is discussed in FIG. 6. Such a sensing device allows detection of building elements that are coupled, and communication the coupling status.

Figure 1:
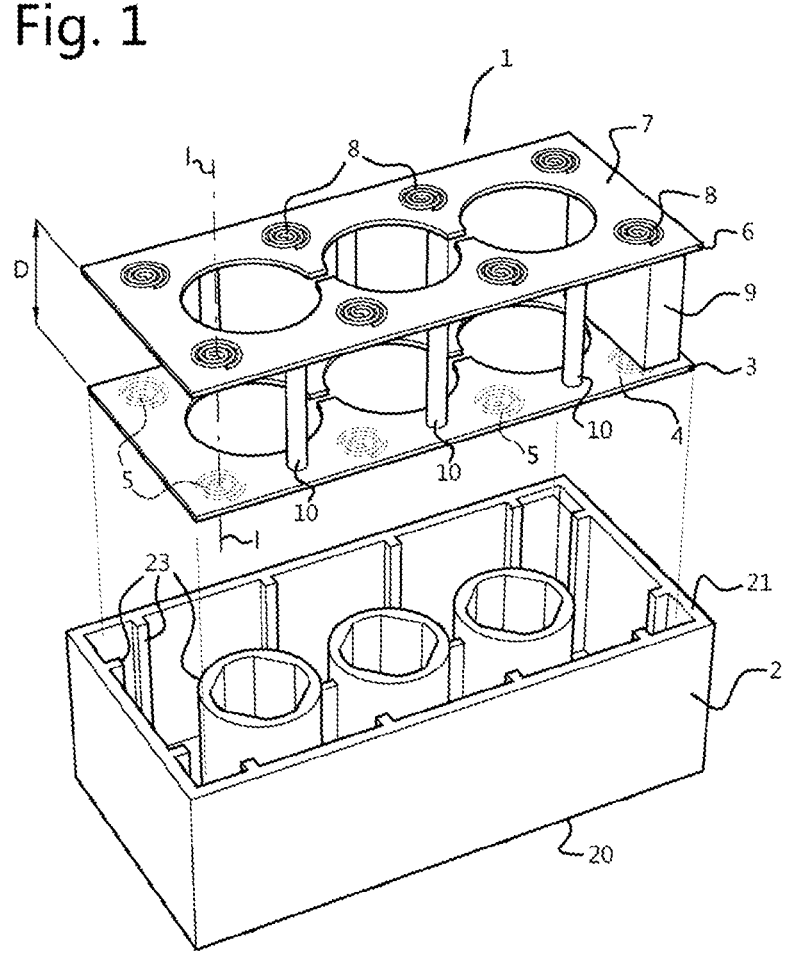
FIG. 1 an exploded view showing a building element and sensing device.
Figure 2:
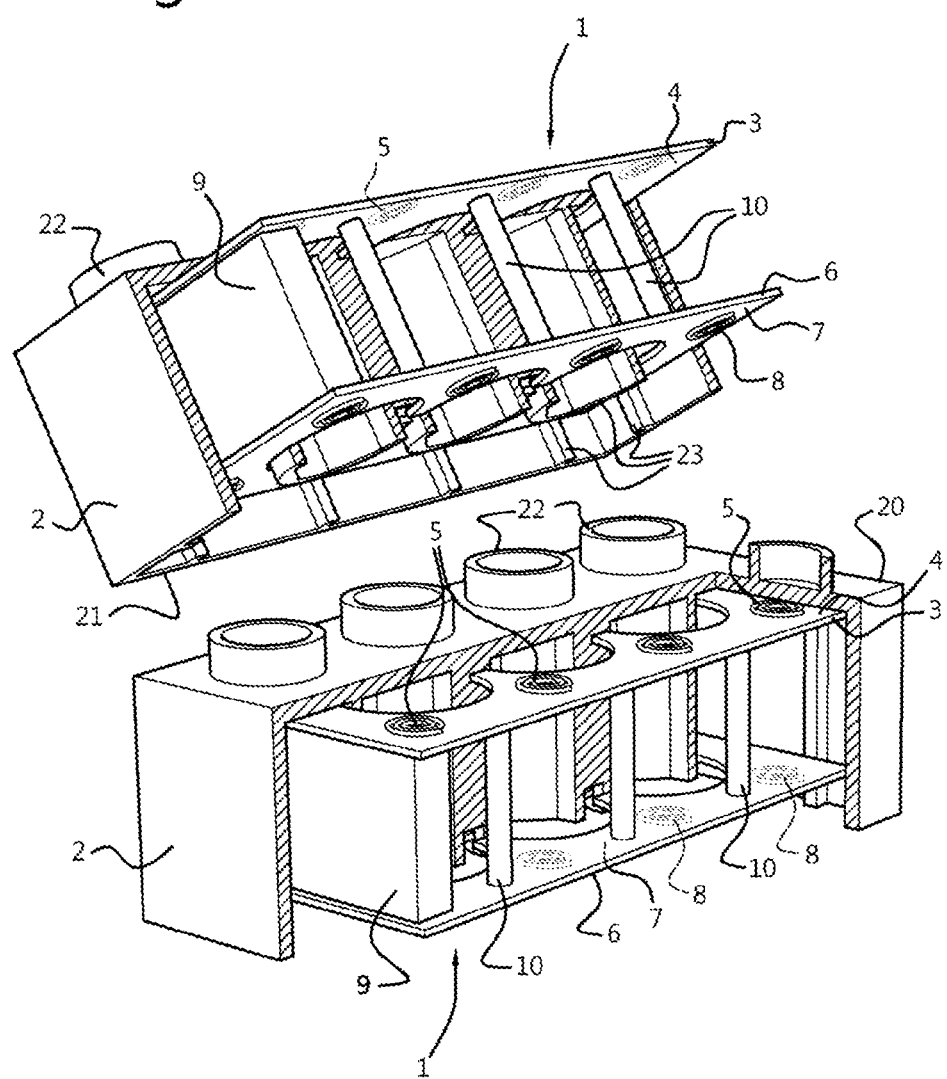
FIG. 2 a view, in partial cross section, of two building elements with fitted sensing device of FIG. 1.
Figure 3:
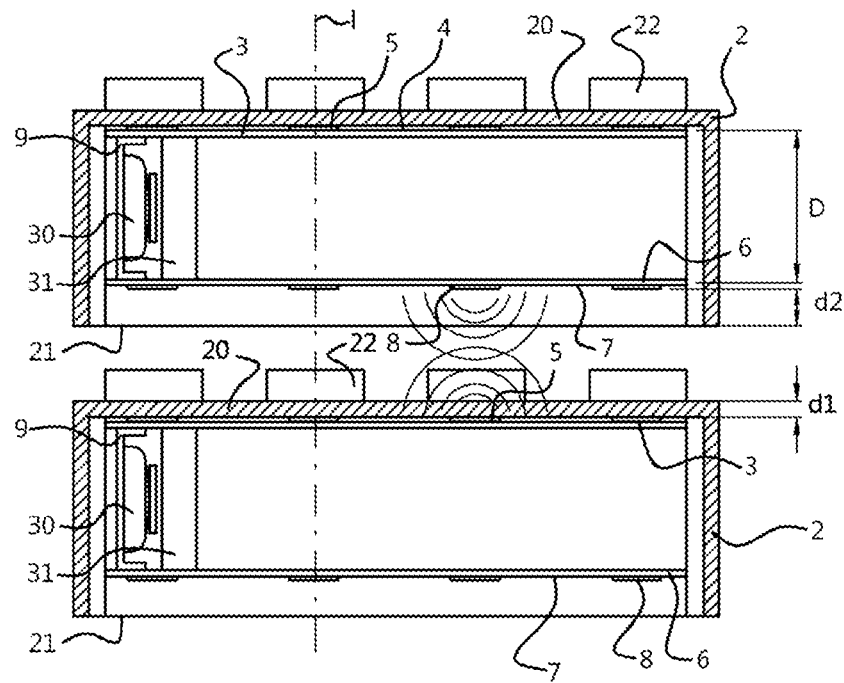
FIG. 3 two building elements with fitted sensing device of FIG. 1, fully aligned and ready to be attached onto one another.

FIG. 1 shows an exploded view of a sensing device 1 and a building element 2. FIGS. 2 and 3 show the same building element 2 as in FIG. 1, at other angles and partly in cross section. In these drawings the building elements 2 are identical or almost identical to the well-known Lego® building blocks or Mega Bloks®, and in FIG. 5 some other configurations of these building blocks 2 are shown.

The known building blocks 2 of FIGS. 1-3 and 5 typically comprise hollow box-shaped blocks having tops with outwardly facing surfaces which are provided with primary coupling members 22 in the form of for instance cylindrical projections or studs ("studs"). The studs 22 are located at evenly-spaced positions in regular n*m row and column array arrangements, which for embodiments such as the standard rectangular parallelepiped building blocks 2 shown (e.g., standard LEGO™ block with length L=3 cm*width W=1.5 cm*height H=1 cm rectangular size format and 2*4 stud arrangement) are so disposed that four studs 22 form the corners of a square. Downwardly opening hollow cavities are defined by inside surfaces of the top and sides of the building blocks. Located within the cavities are secondary coupling members 23 in the form of cylindrical tubular elements that depend from the top inside surfaces at positions corresponding to centres of the squares whose corners are formed by the studs 22, and which when two building blocks 2 are interconnected will fit in between four of the studs 22.

The known building blocks 2 are typically fabricated using injection moulding of thermoplastic material, with the coupling members 22, 23 and insides of the cavities being dimensioned, configured and adapted so that building blocks 2 may be removably interconnected by causing the coupling studs 22 of one building block 2 to enter the cavity of another building block 2, whereby the studs 22 frictionally engage with the inside walls that define the cavity and with the adjacent tubular element centrally in the cavity, together defining the secondary coupling members 23. As described in U.S. Pat. No. 6,645,033, the coupling studs may be substantially cylindrical tubes, and additional flanges or ribs ("ribs") may be provided extending outwardly from the inside surfaces defining the cavities and/or from the tubular elements at points of frictional engagement of those surfaces and elements of one building block 2 with the studs 22 of another building block 2. This is all well known to those used to playing with Lego®.

In the drawings, the sensing device 1 is explained using these well-known building blocks 2 as a building element that can be coupled to one another using respective coupling parts. In a more generalized embodiment, the sensing device 1 can be used in building elements 2 that have respective coupling parts for coupling the building elements 2 together. Thus, the shape of the building elements does not need to be a block. Furthermore, the coupling parts can also have a different shape, position, number, or working principle. For instance, in the building Another example of coupling and holding of building elements is described in US2014273730, US2014274417, US2014274416. The current sensing device may be used or included in these elements for sensing alignment or for sensing presence of other elements.

It was found that the known building blocks 2 shown in FIGS. 1-3 and 5 proved an easy and well-defined basis for developing the sensing device 1. The building blocks 2 provide a well-defined coupling position with respect to one another. Building blocks 2 can be partly coupled, as demonstrated in FIG. 5. Furthermore, coupling is relatively secure. In an abstract sense, these building blocks have first and second coupling members or coupling parts 22, 23. These are provided on opposite sides or faces of the building blocks to allow stacking in a releasably matting manner. The sensing device 1 allows detection of attaching building blocks 2 together. When detection levels are set more sensitive, approaching of one building block 2 towards another building block 2 may be detected. Furthermore, alignment and orientation of building blocks 2 with respect to one another may be detected and established.

The sensing device 1 and building element 2 of FIG. 1 are in fact upside down in order to show how the sensing device 1 can be slid into the building element 2. The sensing device 1 has a carrier comprising in this embodiment an upper carrier plate 3 and a bottom carrier plate 6. These provide respective top or upper surface 4 and lower or bottom surface 7 of the carrier. The upper and lower surface are here separated a distance D from one another. In this embodiment, the surfaces are separated a distance D of 0.5-2 cm. The building elements can be such that when building elements are coupled, their sensing elements have a spacing of less than 0.5 mm. In examples, their spacing d1+d2 can be 0.1-0.3 cm. In smaller building elements, the surfaces of a sensing device 1 may even be separated is little as 0.5-0.1 cm. Usually, d1+d2 in these situation can be 0.01-0.1 cm. In this embodiment, spacers 10 hold the upper and bottom carrier plates 3, 6 apart. In an embodiment, the carrier plates 3, 6 can be printed circuit boards, PCB's.

The sensing device 1 comprises a series of sensing elements. Here, the sensing elements comprise a series of top coils 5 at one side of the carrier and a series of bottom coils 8 at an opposite side of the carrier, at a distance D from the top coils 5. The coils shown in the drawings are relatively schematic. The coils 5, 8 are in fact configurations which, if a current runs through a coil, generate an electromagnetic field. In an embodiment, the coils generate a magnetic field. In fact, the coils may be operates as micro antennas. When distances between sensing devices become small, their operation may be in the field of "Near Field" communication. In a particular embodiment, the coils can be printed or in another way produced onto the PCB's of the carrier. In the drawings, the coils are spiral shaped. The coils may also have another shape having the same function of generating a magnetic field. As such, this is known to a skilled person. For instance, several coils may be produced on top of one another to function as a single coil. Furthermore, a coil may comprise a core for modifying or shaping the produced and/or received magnetic field.

In an embodiment, the sensing elements may also be provided as patch antennas. These as such are well known to a skilled person. A patch antenna is a narrowband, widebeam antenna fabricated by etching the antenna element pattern in metal trace bonded to an insulating dielectric substrate, such as a printed circuit board, with a continuous metal layer bonded to the opposite side of the substrate which forms a ground plane. Common microstrip antenna shapes are square, rectangular, circular and elliptical, but any continuous shape is possible. Some patch antennas do not use a dielectric substrate and instead made of a metal patch mounted above a ground plane using dielectric spacers; the resulting structure is less rugged but has a wider bandwidth. Because such antennas have a very low profile, are mechanically rugged and can be shaped to conform to the curving skin of a vehicle, they are often mounted on the exterior of aircraft and spacecraft, or are incorporated into mobile radio communications devices.

Microstrip antennas are usually employed at UHF and higher frequencies because the size of these antennas is directly tied to the wavelength at the resonant frequency. A single patch antenna usually provides a maximum directive gain of around 6-9 dBi. It is relatively easy to print an array of patches on a single (large) substrate using lithographic techniques. Patch arrays can provide much higher gains than a single patch at little additional cost; matching and phase adjustment can be performed with printed microstrip feed structures, again in the same operations that form the radiating patches. The ability to create high gain arrays in a low-profile antenna is one reason that patch arrays are common on airplanes and in other military applications.

Such an array of patch antennas is an easy way to make a phased array of antennas with dynamic beamforming ability.

An advantage inherent to patch antennas is the ability to have polarization diversity. Patch antennas can easily be designed to have vertical, horizontal, right hand circular (RHCP) or left hand circular (LHCP) polarizations, using multiple feed points, or a single feedpoint with asymmetric patch structures. This unique property allows patch antennas to be used in many types of communications links that may have varied requirement The sensing elements, when used at a relatively short distance, in fact may operate equivalent to "Near Field" which is in fact as such known to a skilled person.

Near-field (or nearfield) communication (NFC) is a form of short-range wireless communication where the antenna used is much smaller than the wavelength of the carrier signal (thus preventing a standing wave from developing within the antenna). In the near-field (approximately one quarter of a wavelength) the antenna can produce either an electric field, or a magnetic field, but not an electromagnetic field. Thus NFC communicates either by a modulated electric field, or a modulated magnetic field, but not by radio (electromagnetic waves). For example, a small loop antenna (also known as a magnetic loop) produces a magnetic field, which can then be picked up by another small loop antenna, if it is near enough.

Magnetic NFC has a useful property of being able to penetrate conductors that would reflect radio waves.

In NFC, if another similarly small antenna comes into this field, it will induce an electric potential into it, alternating at the same frequency. By modulating the signal in the active antenna, one can transmit a signal to the passive, receiving antenna.

In the current sensing elements, it may for instance be possible to operate the sensing elements in open platform technology standards like ECMA-340 and ISO/IEC 18092. NFC in general incorporates a variety of existing standards including ISO/IEC 14443 both Type A and Type B, and FeliCa.

NFC in general is a set of short-range wireless technologies, typically requiring a distance of 10 cm or less. NFC for instance operates at 13.56 MHz on ISO/IEC 18000-3 air. NFC peer-to-peer communication is possible, provided both devices are powered.

The coils 5, 8 are functionally aligned with coupling parts of the building element 2. Here, the top coils 5 are positioned in one plane, and the bottom coils 8 are positioned in another plane. Here, these planes are planar and parallel. In order to allow practical operation, the data processor should have the alignment between coils and coupling elements. This, the data processor can determine a status of coupling parts. In FIGS. 1-3, the studs 22 are all in a single, planar plane just like the associated top surface 4. Thus, the coils axes '1' are in line with the studs 22 of the building element 2. Furthermore, the distance between the top coils 5 and the coupling parts, here studs 22, is fixed and known. It is known the Lego has many shapes of building elements. If, for instance, the top face 20 of a building element 2 would not be planar, but for instance stepped, then in an embodiment the upper surface 4 of the sensing element 1 would follow that top face 20. Thus keeping the distance between coupling parts (here studs 22) and sensing elements (here coils 5). In this example of FIGS. 1-4, a building element 2 that has 2×4 studs 22 has one sensing element 1 with the same configuration of sensing elements 5, 8 on the sensing device 1. For production and sales flexibility, it is considered to provide a sensing device 1 that has a standardised shape and standardised number and orientation of sensing elements 5, 8. For instance, a sensing device may have 2×2 sensing elements 5, 8 an each carrier plate 3, 6. Thus, a sensing device 1 may fit the building elements 2 indicated with B, C, E, F, G in FIG. 5. In such an embodiment, building elements 2 indicated with A, D, H may each be fitted with two sensing devices 2. Thus, one sensing device 1 below studs 1-4, and one sensing device 1 below studs 5-8.

Furthermore, in this embodiment of FIGS. 1-4, the top coils 5 have their axes normal to the plane, and the bottom coils 8 have their axes normal to the plane. Furthermore, the top coils 5 are here aligned with the bottom coils 8. This may allow the sensing device 1 to determine stacking, and of coupling. In fact, it may even allow sensing devices to determine if more building elements are coupled, and if a building element is part of a stack of building elements 2. The top coils 5 are here regularly spaced. In fact, the coils are provided in a regular n×m matrix. When, however a position of coils is accurately known, the data processor using for instance signal processing and knowledge of the position or its influence on a generated or received electromagnetic field may be able to use this in determining status of coupling parts and/or of a coupling status of the element.

In the embodiment of FIGS. 1-3, the sensing device 1 fits into the building element 2. The sensing device 1 can for instance itself also be provided with a protective layer (not shown) for protecting it from outside influences, like for instance moist or water, or shocks or mechanical handling. For instance, the sensing device 1 may be encapsulated by a relatively thin layer of polymer material, for instance a thermoplastic layer of an elastomeric layer. These layers can be thin in comparison to the material of the building elements 2. The protective and/or sealing layer may further provide form fitting of the sensing device 1 into a building element 2, in particular a building element 2 that is open at one end, as shown in FIG. 1. In an alternative embodiment, the sensing device 1 may be integrated into a building element 2, for instance by combining injection moulding, 3D printing, and other technologies.

Figure 4:
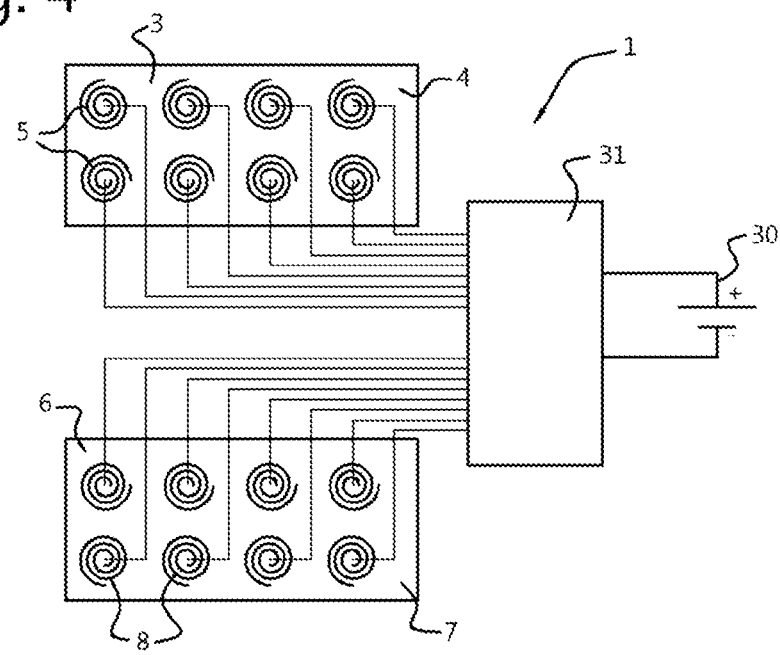
FIG. 4 a schematic drawing of a sensing device take apart.

In FIGS. 2 and 3, the sensing device 1 can be seen when fitted into a building element 2. In these figures, part of the building elements 2 is cut away. In these embodiments, the sensing device comprises a housing 9 for some further components like a data processor 31 (FIG. 4) and a power storage 30 (FIG. 4). The data processor may also in an embodiment be for instance wire-bonded onto one of the printed circuit boards (PCB's) that make the carrier.

The sensing device 1 in an embodiment further comprises a data processor 31. The data processor 31 when operating processes digital data and enables running a computer program. The data processor is functionally coupled to the sensing elements, i.e., to both the top coils 5 and the bottom coils 8. The functional coupling allows the data processor 31 to determine a current strength through each of one the top and bottom coils 5, 8. Furthermore, the data processor 31 is coupled to each of the coils to apply a predefined current to each of the top and bottom coils 5, 8. This allows the sensing device to determine changes in the electromagnetic field of each of the sensing element 5, 8, and to induce a change in the electromagnetic field of each of the sensing elements 5, 8. Thus, the sensing device 1 can handle incoming communication and provide outgoing communication, thus in a sense both listen and speak. The sensing device 1 may comprise some more or less complex electronics and circuitry for each sensing element 5, 8. Thus, for instance, each coil 5, 8 may comprise an analog of digital circuitry, even a PLC, for processing signals. In an embodiment, the circuitry may even provide a binary value indicating coupling of coupling parts and another value if the coupling part is free.

The sensing device further comprises a storage for electrical power 30. Such a power storage may comprise a battery, or for instance a capacitive charge storage device. The storage for electrical power in an embodiment can be charged wirelessly. For instance using inductive of capacitive power transfer. These technologies are as such known to a skilled person.

In FIG. 4, schematically a sensing device is laid open. The sensing device comprises the two opposite carrier plates 3, 6 each having a respective surface 4, 7 and provided with respective coils 5, 8. In this embodiment, a data processor 31 is functionally coupled with each of the coils 5, 8. This functional coupling allows control of the current through each of the coils, in particular control of the individual current through each coil 5, 8. Furthermore, the functional coupling allows the data processor to read a current through each of the coils 5, 8. The data processor 31 is coupled to the supply of electrical power 30, here schematically indicated with a battery.

In FIG. 5, an assembly is shown comprising a playboard 50, various building elements 2, each separately indicated A-I, and a remote device 40 comprising a display 41.

The playboard 50 has coupling parts 51 that allow coupling of building elements 2 to the playboard. The playboard 50 further as a surface 52 and playboard sensing elements, here again coils 53, below its surface 52. The playboard 50 may also comprise a power source, for instance a wired connection 54 to the mains.

In the playboard 50, the playboard coils 53 are functionally aligned with the coupling parts 51.

The playboard 50 may further comprise a data processor, not indicated. The data processor may be functionally coupled to each of the playboard coils 53 for controlling a current through each of the playboard coils 53. The data processor may also be coupled to each of the playboard coils 53 for reading a current through each of the playboard coils 53. The different elements coils 53, data processor, and the like may be integrated into the playboard, or may be provided as add-in elements that may be attached or inserted into the playboard later on.

The remote device 40 in an embodiment is a remote computer device, further comprising a wireless data transmitter. The remote device 40 can for instance be a smartphone, a tablet, or a laptop. This allows data transmission with for instance the playboard 50 and/or at least one of the sensing devices 1 in one of the building elements 2, indicated individually A-I.

The sensing device allows different modes of dealing with status information of coupling parts and/or status information on an element.

In FIG. 5, each of the building elements 2 is provided with one or more sensing devices. The sensing devices are provided in such a way that each coupling part status of each building element 2 can be determined. Thus, in fact each construction element comprises at least one sensing device together holding at least the status information for each coupling part of the construction element.

Suppose for instance building element D which is according to FIGS. 1-3. Suppose its coupling elements can be indicated 1-4 from left to right for the rear row, 5-8 from left to right for the front row, 9-12 from left to right for the rear bottom row and 13-16 from left to right for the rear front row. Suppose the coupling parts of the building elements C and E can be indicated in the same way.

The data structure of the sensing device of element D may look as follows:

Construction element ID-D 2×4
1-0
2-0
3-0
4-0
5-0
6-0
7-0
8-0
9-C-2
10-0
11-0
12-E-1
13-C-4
14-0
15-0
16-E-3

All the other building elements B-I hold similar data structures. A data structure filled with status data of each coupling part (or, in fact, sensing element) is referred to as the status information. The status information of all the building elements of the system, i.e., their completed data structures, can be referred to as the configuration or the configuration information. There are various ways this configuration information may be provided to remote device 40. These various way may also be combined.

In a first embodiment, each sensing device 1 has its own wireless transmitter that transmits its data structure with status information to the remote device 40. The remote device may then construct the configuration information from the separate sets of status information of each sensing device 1.

In another embodiment, the sensing devices 1 of each building element 2 (A-I) transmits its status information to the playboard 50. Playboard 50 may combine all the status information into configuration information and transmit the configuration information to the remote device 40.

In another embodiment, the sensing devices use one or more of their sensing elements to transmit data to sensing devices of other building element(s). The mode of transmission is, i.e., parallel or serially, is in more detail discussed above. This transmission may for instance take place when a higher building element is coupled to a lower building element. In the example of FIG. 4, when building element D is coupled to C and E, it transmits its status information to building elements C and E. Building elements C and E transmit that status information to respectively B and F, and these transmit to A and G, and these transmit to the playboard 50. Alternatively, elements A and/or G transmit to remote device 40. Elements may comprise various aspects of router functionality.

Playboard 5 may have its own, simplified data structure indicating each of its coupling parts 51, and for each coupling part various layers and an indication of it is occupied or not. Thus, the first layer indicated coupling parts that are coupled or not. The second layer indicates coupling parts of building elements 2 that are placed on the playboard that have building elements 2 placed on top of them, and so on.

The playboard 50 and building elements 2 provide a system that can transmit the configuration of building elements 2 to an external device 40, as indicated in FIG. 5. Here, schematically it is indicated how the system transmits via waves 55 its configuration to a remote device 40. Remote device 40 comprises a data processor that allows processing of the configuration data and, if desired, to provided an indication of the configuration on display 41. The configuration may be displayed as it is. Alternatively, a scene may be displayed with the configuration schematically shown, or shown in a more complex manner. For instance, the actual building elements may form the construction or object of FIG. 5, and on display 41 this is displayed as a corresponding bridge over a river. In fact, a remote device 40 may generate a visual representation, for instance using holographical projection, display using for instance virtual reality devices like the Oculus Rift.

The building elements may also be placed upon an interactive surface like an iPad of the like. Thus, the building elements 2 may form for instance "apptivity" elements. For instance, a transparent layer can be provided on top of a display like an iPad. Alternatively, the playboard 50 may be partly transparent and may comprise a display.

In the embodiments explained illustrated above and illustrated in the drawings, the carrier comprises two carrier plates 3, 6. In another embodiment, the carrier device may define further surfaces forming a three-dimensional shape. For instance, 6 surfaces may define a cube or a block. Using for instance four further carrier plates similar to the top carrier plate 3 and the bottom carrier plate 8, and provided with additional coils. There additional carrier can be mutually two by two aligned having their coils aligned. Thus, for instance a cube or block with aligned coils on each face may be provided, providing three-dimensional proximity detection. Furthermore, data transmission and receipt of data may be provided.

Figure 6:
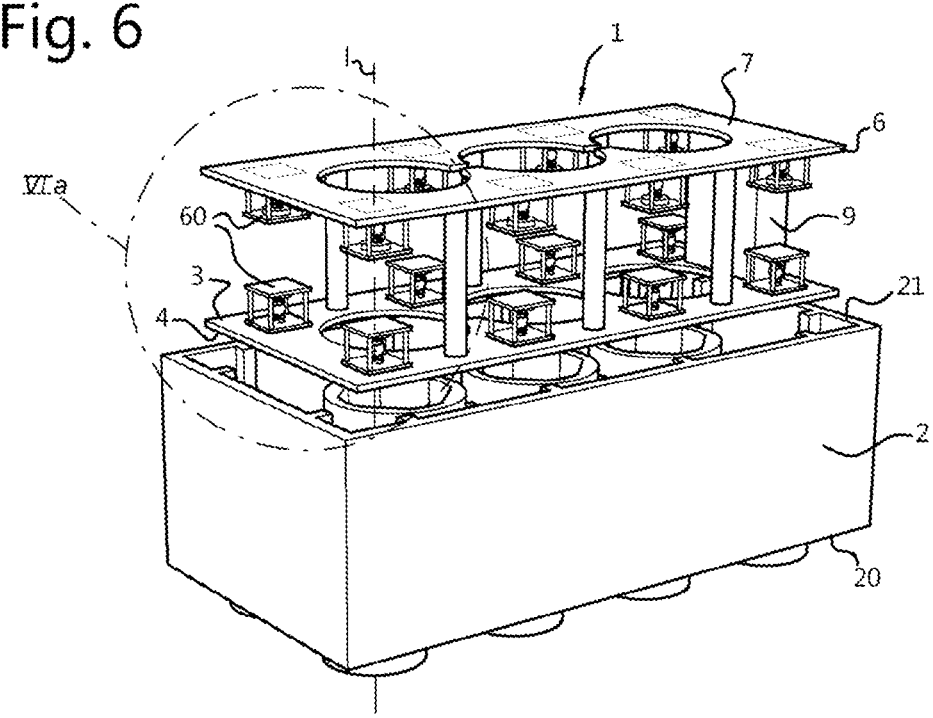

In a general sense, shown in FIGS. 1 and 6 (to be discussed below), examples are given in which the sensing device 1 uses an array of spaced distance sensing elements 8 and 5, 60 respectively. In particular, two separates layers of arrays of sensing elements are provided. More than two layers may be provided. In an embodiment, each layer of sensing elements comprises sensing elements that are regularly spaces, provided in regular n×m row and column array. In an embodiment, the sensing elements one layer of sensing elements are aligned with the sensing elements of another layer of sensing elements. As explained above, the sensing elements can be functionally aligned, including alignment. Using signal processing and/or data processing, other associations of coupling parts and sensing elements may be possible that allow the sensing device to determine a status of each of the coupling parts of the associated element.

Figure 6A:
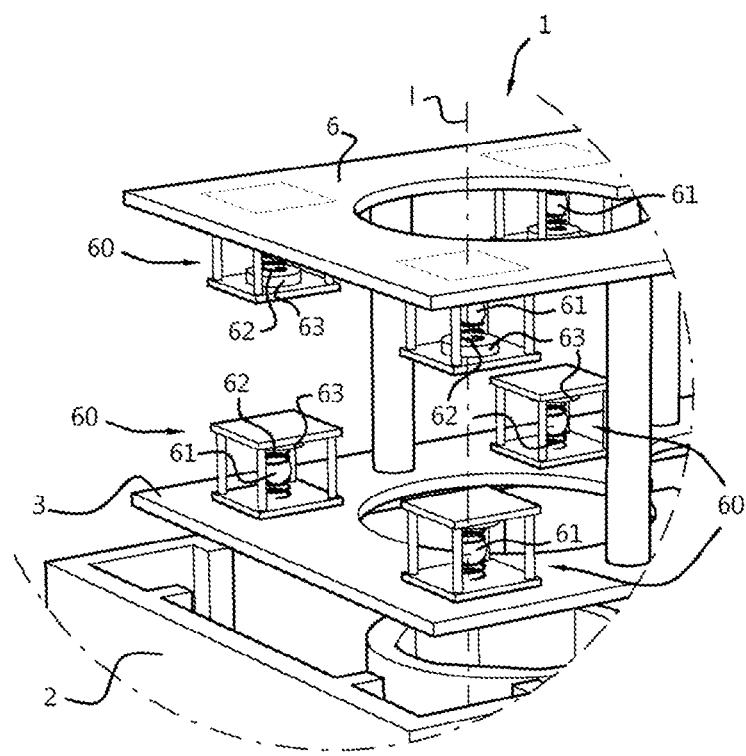
FIG. 6*a* a detail of FIG. 6 as indicated.

Each sensing element 60 of a sensing device 1 provides an indication of presence of another sensing element 60 of another, similar sensing device 1. The layout of these similar sensing devices 1 does not need to be identical, as for instance indicated in FIG. 5. In FIGS. 1-4, the sensing elements 60 are coils 5, 8, that can in fact be used actively, i.e., they can generate a field of which in particular the strength and variation in time can be set. The coils can also be used to record the presence of another, activated, coil. Alternative sensing elements 60 can also be used. Here, the sensing elements 60 also use a magnetic field. In the alternative embodiment shown in FIG. 6 and with FIG. 6a showing the sensing elements 60 in more detail, the sensing device 1 comprises sensing elements 60 comprising a magnetic part 61 that is displaceable along a guiding part 62. The guiding parts 62 defined a displacement track. Sensing element 60 further comprises a magnetic field sensor 63. Suitable magnetic field sensors 63 are for instance a Hall sensor or a Reed sensor. The placement in the drawing is indicative. The magnetic field sensor 63 allows detection of a changing magnetic field due to a displacement of the magnetic part 61 along the guiding part 62. When a sensing element 60 of one sensing device 1 approaches a sensing element 60 an another sensing device 1, the magnetic parts 61 will at a defined distance from one another exert a magnetic force onto one another. This will cause the magnetic parts 61 to displace along with respect to the guiding part 62 along at least part of the displacement track. The magnetic field sensors 63 will detect a changing magnetic field due to the displacing magnetic parts 61. In FIG. 6a it is visible that the guiding part 62 may comprise a coil spring holding the magnetic part 61. Other or additional parts may be provided for guiding the magnetic part 62 back and forth in the sensing element 60. Alternatives may comprise guiding rails, guiding rods, and the like that limit the motion of the magnetic part 61 along one line, in the drawing up and down.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

REFERENCE NUMBERS 1 sensing device
2 building element
3 (upper)carrier plate
4 top or upper surface
5 top coils
6 (bottom)carrier plate
7 lower or bottom surface
8 bottom coils
9 housing
10 spacers
20 top face of building element
21 bottom face of building element
22 first or upper coupling parts
23 complementary of lower coupling parts
30 battery
31 data processor
40 remote computer device
41 display
50 playboard
51 playboard coupling parts
52 playboard surface
53 playboard coils
54 power cord/power supply/mains
55 transmission of data to remote device
56 receiving data from element of assembly of sensing device
60 sensing element
61 magnetic part
62 guiding part
63 sensor part
D upper and lower coil distance
d1 distance top face to top coils
d2 distance bottom coils to bottom face

The invention claimed is:

1. A sensing device in a construction element for a toy construction set, said sensing device comprising a carrier comprising a top surface provided with a series of top coils with their axes functionally parallel, a bottom surface with a series of bottom coils at a distance from said top coils and with their axes functionally aligned with said top coils, the sensing device further comprising a data processor functionally coupled with a memory for storing a status of each of said top and bottom coils, said data processor functionally coupled with said top and bottom coils for controlling an electrical current through each of said top and bottom coils and for recording changes of current in each of said top and bottom coils, allowing detection of alignment of at least one coil of another, similar sensing device with a coil of said sensing device, wherein said data processor comprises a computer program which, when running on said data processor, controls a current through each of said top and bottom coils, reads a current through each of said top and bottom coils, and from a change of said current and a level of said current calculates a status for each of said top and bottom coils, and stores said status for each coil in said memory.

2. The sensing device of claim 1, wherein said top surface and bottom surface are functionally parallel.

3. The sensing device of claim 1, wherein said top surface and bottom surface are functionally planar.

4. The sensing device of claim 1, wherein said data processor comprises a data transmission program for controlling a current through at least one of said coils from providing an electromagnetic field that is representative of a data stream, in particular said data transmission program is provided for converting said statuses or statuses of other sensing devices into a data stream representative of said statuses.

5. The sensing device of claim 4, wherein said data transmission program splits said data stream into a series of data stream parts and controls a series of coils in a layer to functionally simultaneously each transmit at least one of said data stream parts for providing a substantially parallel transmission of said data stream.

6. The sensing device of claim 1, wherein said data processor comprises a data receiving program for converting a current through at least one of said coils into a data stream, in particular a data stream representative of said statuses, and for converting said data stream into said statuses.

7. The sensing device of claim 6, wherein said data receiving program functionally simultaneously converts currents through a series of said coils into a series of data stream parts, and in particular converts said data stream parts into said statuses for providing a substantially parallel receiving of said statuses.

8. The sensing device of claim 1, wherein said carrier comprises two printed circuit boards, an upper printed circuit board providing the upper surface and a bottom printed circuit board providing the bottom surface.

9. The sensing device of claim 1, wherein when a coil is aligned with a first, similar sensing device and an other coil is aligned with a second, similar sensing device, the sensing device selectively transmits data, in particular status information, to the first, the second or both other, similar sensing devices.

10. The sensing device according to claim 1, wherein said data processor comprises a data storage comprising a data structure comprising a sensing device ID, information indicative of a relative coil position of each coil of said sensing device, and per coil a data position information indicative of alignment with a coil of another, similar sensing device.

11. The sensing device of claim 10, wherein in said data structure said information indicative of alignment with a coil of another, similar sensing device comprises a sensing ID of said other, similar sensing device, and information indicative of a relative coil position of said aligned coil of said other, similar sensing device.

12. A construction element for a toy construction set, comprising a body part with a top face and a bottom face seen relative to the normal use situation of the construction element, wherein the top face comprises first coupling parts, wherein the bottom face comprises complementarily coupling parts that are configured for removably interconnecting with corresponding first coupling parts of another construction element; and a sensing device positioned in said body part and comprising a carrier comprising a top surface directed to said top face of said body part and provided with a series of top coils functionally aligned with at least a number of said first coupling parts and a bottom surface directed towards said bottom face of said body part and provided with a series of bottom coils functionally aligned with said top coils, the sensing device further comprising a data processor, functionally coupled with said top and bottom coils for recording changes of current in each of said coils, allowing detection of presence of another construction element coupled to one or more of the number of first coupling parts, and detecting which of the number of first coupling parts are coupled.

13. The construction element according to claim 12, wherein said bottom coils are functionally aligned with at least a number of said complementary coupling parts, allowing detection of presence of another construction element coupled to one or more of said number of complementary coupling parts, and detecting which of the number of complementary coupling parts are coupled.

14. The construction element according to claim 13, wherein said data processor is functionally coupled with said top and bottom coils for controlling an electromagnetic field from each of said top and bottom coils.

15. The construction element according to claim 12, wherein said series of top and bottom coils are separated from one another at a distance that is larger than a distance of the top coils from the top face and larger than a distance of the bottom coils from the bottom face, in particular a distance that is larger than the sum of a distance of the top coils from the top face plus a distance of the bottom coils from the bottom face.

16. The construction element according to claim 12, wherein said data processor comprises a data structure comprising a construction element ID, and per functionally aligned first and complementary coupling part further construction element ID's of coupled construction elements.

17. The construction element according to claim 12, wherein said sensing device further comprises a data transmitter.

18. The construction element according to claim 17, wherein said data transmitter is adapted for routing or passing on data, in particular to another construction element.

19. The construction element according to claim 17, wherein said data transmitter uses at least one of said coils for wireless data transmission, in particular to another construction element.

20. The construction element according to claim 12, wherein said sensing device further comprises a power storage for electrical power.

21. The construction element according to claim 12, wherein said data processor is provided with software which, when running on said data processor, derives a status of a coupling part from a current or change of current in a coil.

22. The construction element according to claim 12, wherein said sensing device comprises multiple carriers, each carrier providing faces that are orthogonal with respect to faces of the other carriers.

23. The construction element according to claim 12, wherein said body part is block-shaped providing three sets of opposite top and bottom faces, and said sensing device providing three carriers providing three sets of opposing faces, each face functionally parallel to body part faces and each face comprising coils, each coil functionally aligned with one selected from a first coupling part and a complementary coupling part.

24. A system comprising a series of construction elements according to claim 12 and a computer system comprising a display device, a data processor and a data receiver, wherein said data processor is provided with software which, when running on said data processor, allows receiving of data from at least one of said construction elements, and provides a representation on said display device indicating a number of construction elements in their coupled state, in particular providing a representation on said display device during construction using said construction elements.

25. The system of claim 24, wherein said separate computer device provides user feedback in relation to at least one selected from a construction of said construction elements, and during a construction using said construction elements.

26. A system comprising a series of construction elements according to claim 24 and a playfield having a top surface comprising a series of first coupling parts and a series of coils functionally aligned with said series of first coupling parts.

* * * * *